United States Patent [19]
Daoud

[11] Patent Number: 5,908,180
[45] Date of Patent: Jun. 1, 1999

[54] SYMMETRICAL CABLE BRACKETING AND STRAIN RELIEVING MECHANISM AND METHOD

[75] Inventor: Bassel Hage Daoud, Parsippany, N.J.

[73] Assignee: Lucent Technologies Inc., Murray Hill, N.J.

[21] Appl. No.: 09/045,164

[22] Filed: Mar. 19, 1998

[51] Int. Cl.[6] ...................................................... F16L 5/00
[52] U.S. Cl. ............................................................. 248/56
[58] Field of Search .......................... 248/56, 27.1, 74.1; 74/59; 439/304, 133, 936

[56] References Cited

U.S. PATENT DOCUMENTS

| | | | |
|---|---|---|---|
| 4,750,898 | 6/1988 | Soulard | 439/113 X |
| 5,118,057 | 6/1992 | Martin et al. | 248/56 |
| 5,190,465 | 3/1993 | Davidge et al. | 439/304 |

*Primary Examiner*—Ramon O. Ramirez

[57] ABSTRACT

The cable bracket of the present invention generally comprises at least two matingly engageable bracket portions, each having a region for receiving a cable and an arm extending from the distal end of the region. Each arm has a retaining portion and is capable of being moved between a first position and a second position. At the second position, the arms permit the cable to be secured between the retaining portions when the bracket portions are matingly engaged.

21 Claims, 5 Drawing Sheets

SYMMETRICAL CABLE BRACKETING AND STRAIN RELIEVING MECHANISM AND METHOD

FIELD OF THE INVENTION

This invention relates to a multi-part bracket for securing and strain relieving an electrical cable, conduit, hose or the like, that must pass through and be retained in an orifice in a housing, and a method of using such a bracket.

BACKGROUND OF THE INVENTION

Junction boxes have long been used to collect and protect telephone and electrical wires for distribution, splicing, cross connection and other uses. In the telephony arts, such junction boxes are more commonly known as network interface units (NIUs) and/or building entrance protectors (BEPs).

Generally, BEPs consist of a sheet metal or plastic housing with at least one orifice through which an electrical conduit or cable is passed. To prevent the terminated wires from exposure to loads or stresses exerted upon cable, the cable is strain-relieved at the point where it enters the housing wall. Where the cable contains additional wires that are to be terminated elsewhere, the cable is fed through a second orifice to a second housing.

Depending on the design of the building, BEPs may be stacked one above the other or spaced apart over relatively great distances. As such, one problem encountered when laying a cable to and between BEPs is that to position the cable within the BEP housing, the cable must be fed or "pulled" through the BEP orifices. This exercise can be extremely labor-intensive as the weight of the cable must be supported to permit the free end of the cable to be maneuvered through the BEP orifice. Further, when a cable is fed through a BEP orifice, extra care must be taken not to damage the cable insulation as it is pulled through the orifice. As a result, feeding a cable through an orifice increases the amount of time and cost required to properly lay cable.

A second problem encountered when laying cable, is that the diameter of the cable varies depending upon the number of wires required to be terminated at any location. As such, depending on the cable diameter, different methods or products are used to strain-relieve and seal the cable, requiring a significant inventory of various strain relief devices.

It would therefore be advantageous for an apparatus or method to be developed which would alleviate the above-identified shortcomings of the prior art.

SUMMARY OF THE INVENTION

The cable bracket of the present invention is directed at overcoming the shortcomings of the prior art. The bracket generally comprises at least two matingly engageable bracket portions, each having a region for receiving a cable and an arm extending from one end of the cable-receiving region. Each arm has a retaining portion and is capable of being moved between a first position and a second position. When the bracket portions are matingly engaged, and the arms moved into the second position, the arms permit the cable to be secured between the retaining portions. Preferably, the arms are hinged to permit movement from the first position to the second position. When in the second position, with the cable retained therebetween, the arms are secured to each other by a fastener which surrounds the arms and cable.

To reduce fabrication cost and simplify assembly, the first and second bracket portions preferably are identical in construction, and may be fabricated by injection molding. The bracket portions are preferably made of a strong, resilient material, such as, for example, polycarbonate, TEFLON® or polypropylene. When assembled to bracket a cable the bracket portions are symmetrical. The first bracket portion is rotated 180° relative to the direction in which the arm extends such that it mates with the second bracket portion to form a generally cylindrical region between the two bracket portions that encircles the cable.

To use a cable bracket of the present invention for securing a cable passing through an orifice, a first bracket portion is preferably positioned within the orifice in such a position that the bracket arm extends into the housing, although the arm may face outward. The cable is then laid upon the region of the bracket portion designed to receive the cable. Next, the second bracket portion is positioned within the orifice to mate with the first bracket portion and encircle the cable. In the mating position, as with the first bracket portion if so oriented, the arm of the second bracket portion extends into the housing. Finally, the arms of the first and second bracket portions are moved to a position that permits the cable to be secured between the first arm and the second arm. Preferably, the arms are secured in the retaining position by a hose clamp or a cable tie. To ensure that the bracket arms firmly grip the cable, the retaining portions preferably have teeth or other high friction means that securely grip the cable.

In this manner, the method of installing the cable is simplified as the installer can lay the cable over the first bracket rather than pull or feed the cable through the housing orifice. Further, because the cable is not pulled through the orifice, the chances of damaging the cable are minimized. Further, the arms of the bracket serve to strain-relieve the cable so that wires that are broken out from the cable and terminated within the housing are not pulled from their termination points when the cable is subjected to force. Further, by providing arms that are moveable through a variety of positions, the bracket can accommodate cables of widely different diameters. This greatly increases installation flexibility, as one bracket may be provided for an entire range of cable diameters.

Prior to securing the bracket sections, a fire-retardant material is generally applied to seal any gap between the receiving region of the bracket portions and the cable. The fire-retardant material may be a foam or a wrap, such as a preformed cable wrap, or any other art-recognized material that seals the gap between the bracket and the cable to help contain a fire within the housing to which the bracket is applied.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

DESCRIPTION OF THE DRAWING FIGURES

In the drawing figures, which are not to scale, and which are merely illustrative, and wherein like reference numerals depict like elements throughout the several views.

DETAILED DESCRIPTION OF THE PREFERRED EMBODIMENTS

Figure 1:
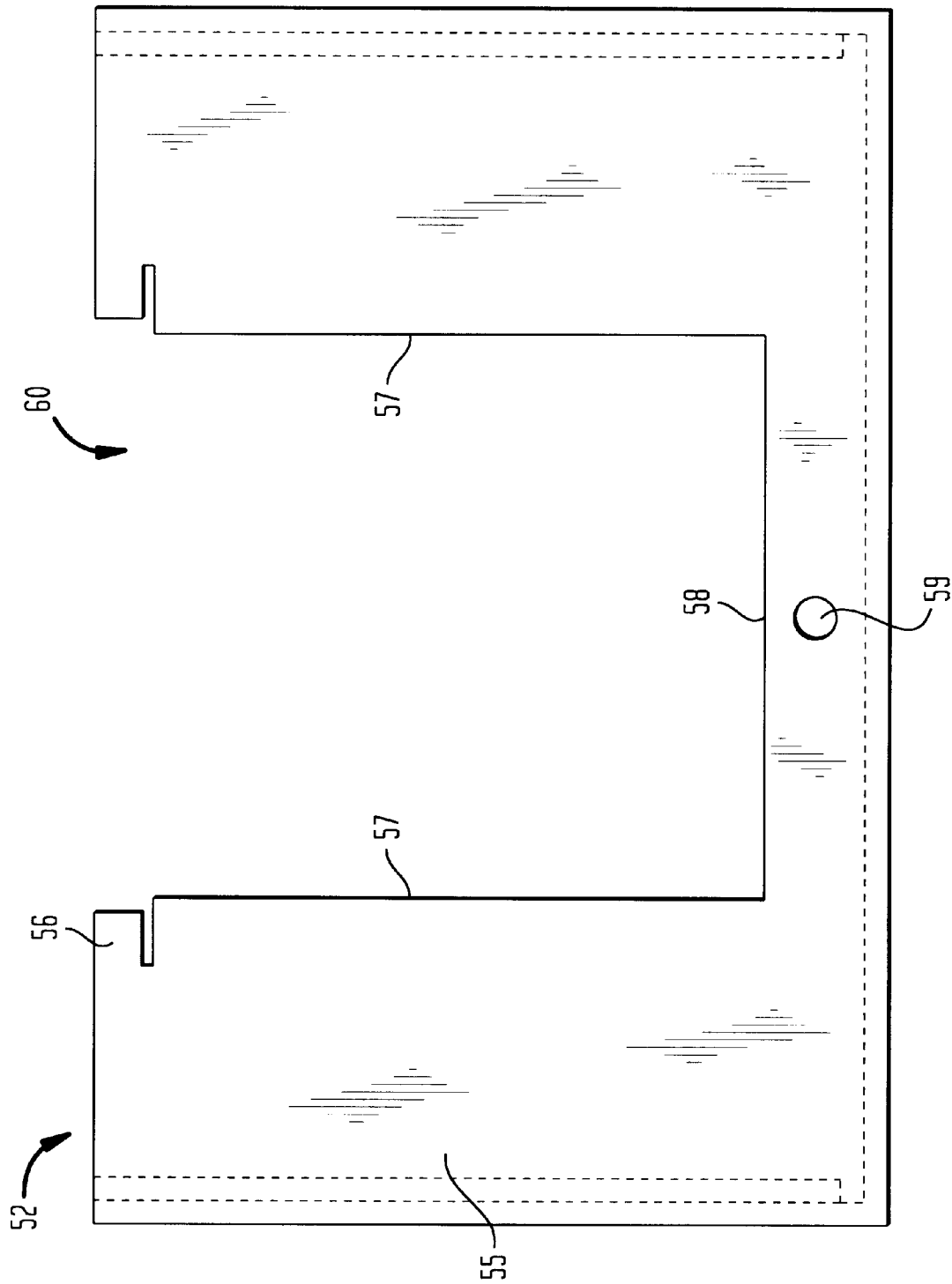
FIG. 1 is an enlarged section view of a portion of a housing having an orifice.

With initial reference to FIG. 1, there is depicted an exemplary portion of a housing, generally indicated as 52, having a wall 55, including tabs 56 and an optional screw hole 59, and an orifice 60 defined by sides 57 and bottom 58. Within housing 52, individual pairs of wires (not shown) are broken out from a cable and terminated.

Figure 3:
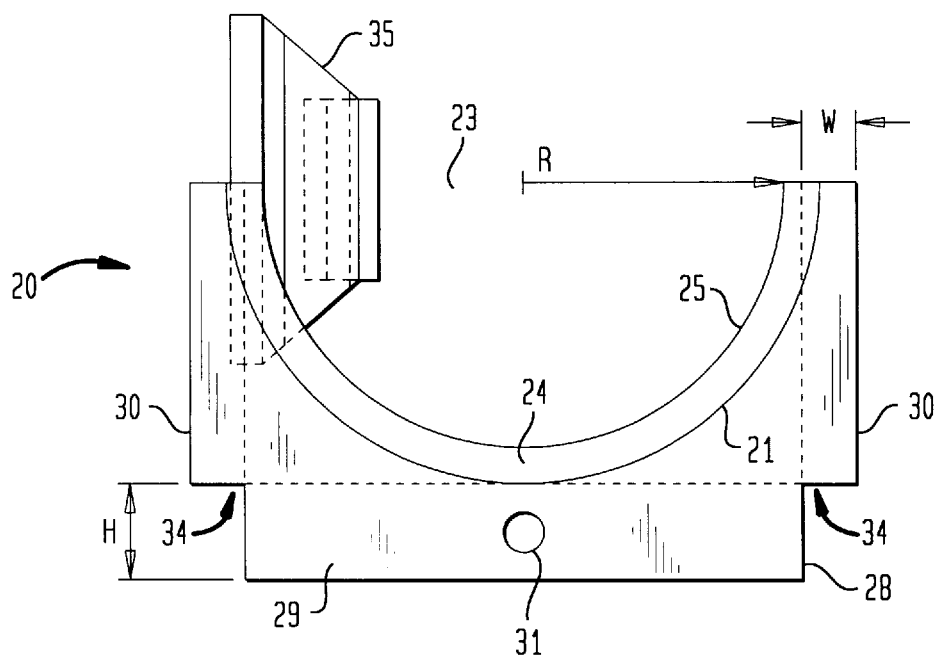
FIG. 3 is a bottom plan view of a bracket portion in accordance with the present invention.

As seen in FIG. 3, there is depicted a bottom plan view of a bracket portion 20 in accordance with the present invention. Bracket portion 20 includes a receiving portion 23, a flange 28 extending radially outward from receiving portion 23, and an arm 35 extending from flange 28.

Figure 2:
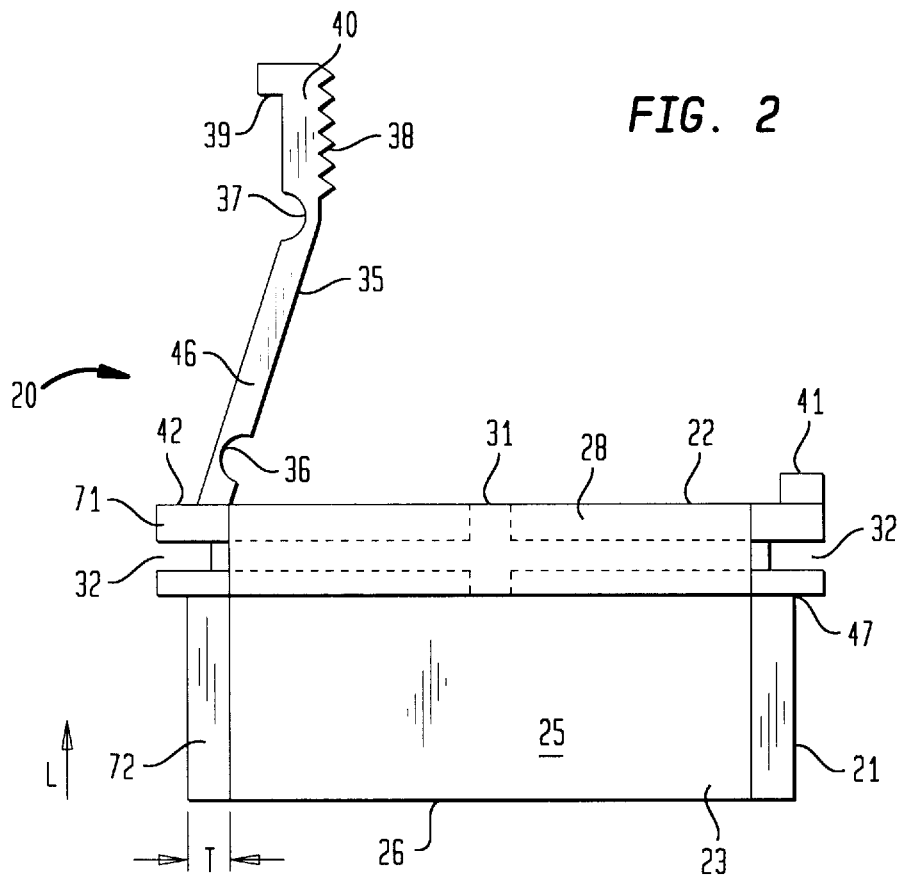
FIG. 2 is a front elevational view of the bracket portion in accordance with the present invention.
Figure 4:
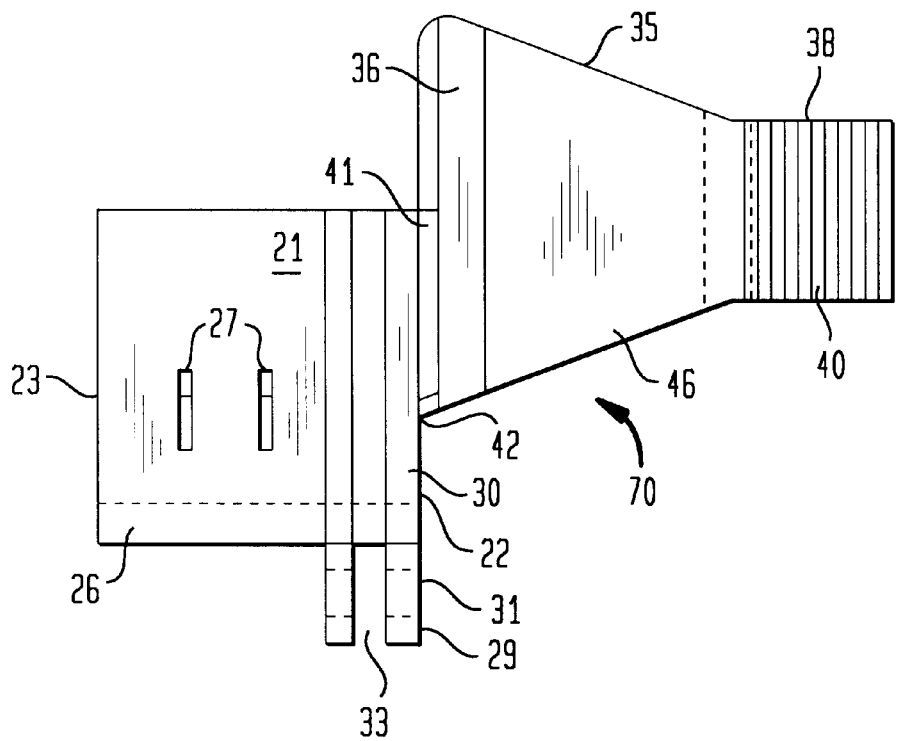
FIG. 4 is a right side elevational view of the bracket portion in accordance with the present invention.
Figure 5:
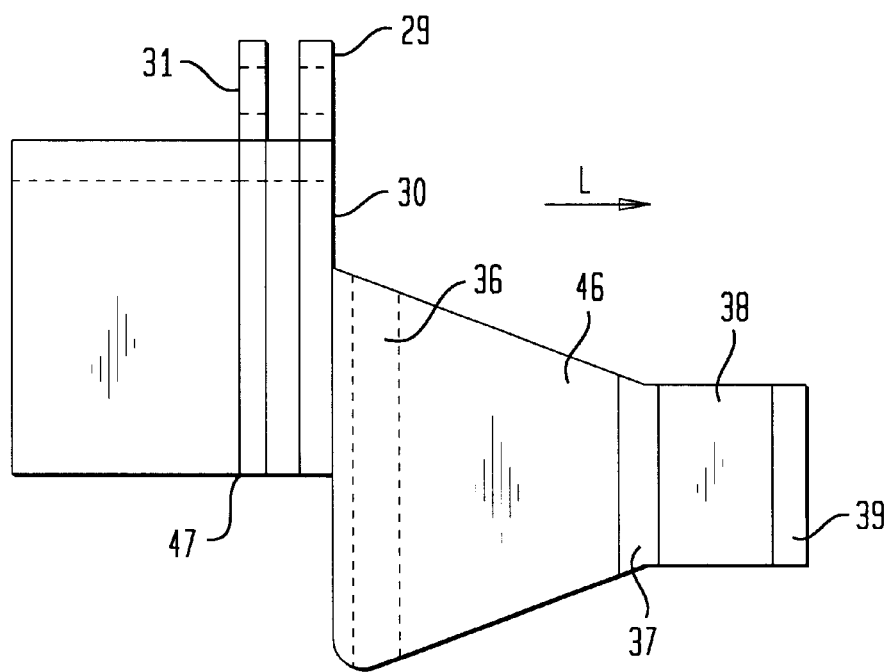
FIG. 5 is a left side elevational view of the bracket portion in accordance with the present invention.

Referring to FIGS. 2 and 3, receiving portion 23 is preferably sized and shaped to receive an electrical conduit. While receiving portion 23 is shown as a half-cylinder, it may be of any shape so long as it provides sufficient area to support a cable resting therein, and, if required, a fire retardant seal, as discussed further herein below. Receiving portion 23 includes a proximal end 26, a distal end 22, and a wall 24 having an inner surface 25, an outer surface 21, and a confronting surface 72. As is shown in FIG. 4, tie retainers 27 for retaining a cable tie 43 (FIG. 6) project from outer surface 21 and are spaced apart to accommodate the width of cable tie 43.

Figure 6:
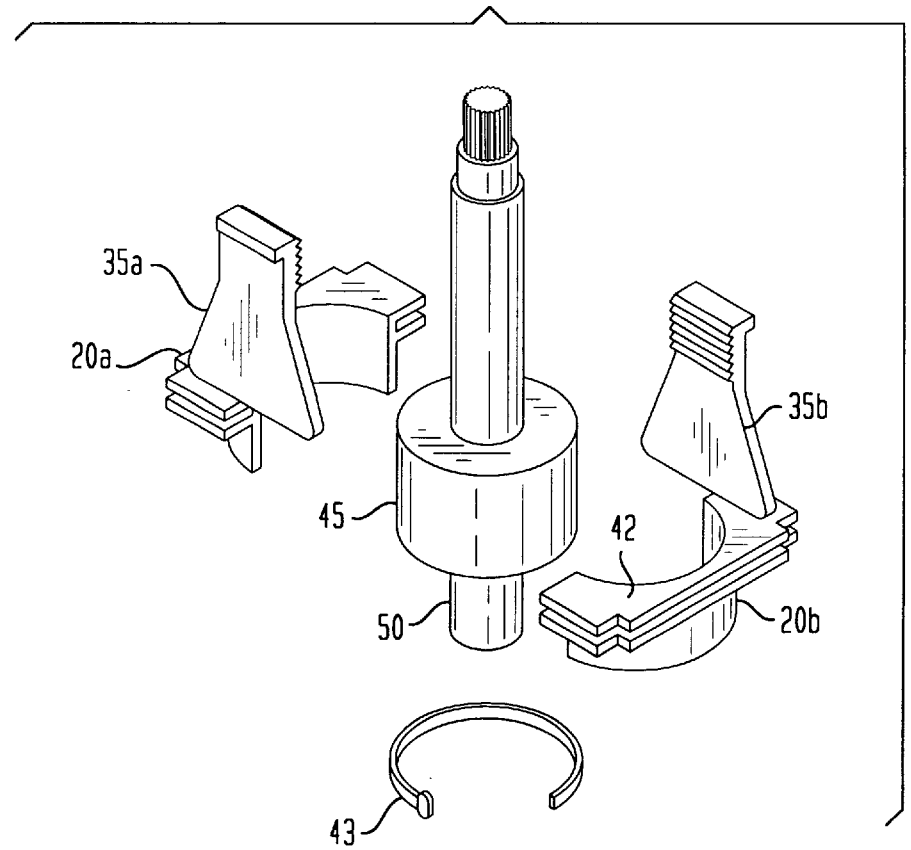
FIG. 6 is an exploded perspective view of a bracket and a cable in accordance with the present invention.

Flange 28 projects radially outward from outer surface 21 of receiving portion 23 in a direction substantially perpendicular to receiving portion 23 from a point 47 to distal end 22. Preferably flange 28 is integral with receiving portion 23, however, flange 28 may be fastened or mounted to receiving portion 23 in any manner known to those skilled in the art. In a preferred embodiment, flange 28 includes two side portions 30 and a middle portion 29, which together with the distal face of wall 24 form a flange face 42 (FIG. 6). Side portions 30 also include a side portion confronting face 71. Middle portion 29 includes a throughhole 31 sized to accommodate an optional screw 63 (FIG. 9) for securing middle portion 29 to bottom 58 of housing wall 55, and positioned to mate with screw hole 59 of housing wall 55. As is shown in FIGS. 2 and 4, flange 28 also includes a shoulder 41 that projects in a longitudinal direction indicated as arrow L from flange face 42. Shoulder 41 is designed to facilitate the mating of bracket portions 20a and 20b during assembly and to provide support to arm 35 when bracket portions 20 are matingly engaged.

Side portions 30 of flange 28 are notched to form side slot 32 for engaging sides 57 of housing wall 55. The dimensions of slot 32 are such that bracket 20 may be readily slid onto housing wall 55 by positioning side 57 within slot 32. To properly engage housing wall 55, slot 32 of side portion 30 is preferably constructed to be aligned with housing side 57 in a linear orientation to prevent the rotation of bracket portion 20 relative to orifice 60 when bracket portion 20 is positioned within orifice 60. Middle portion 29 is similarly notched to form middle slot 33 for engaging bottom 58 of housing wall 55. The dimensions of slot 33 are such that bracket portion 20 will readily engage housing wall 55 by positioning bottom 58 within slot 33.

While bracket portion 20 is illustrated as forming a rectangle when mated with a second bracket portion, it is contemplated that bracket portion 20 may assume any shape so long as slots 32 and 33 engage side 57 and bottom 58 of housing wall 55. Further, it is also contemplated that sides 57 or bottom 58 of orifice 60 may be arcuately or otherwise shaped, and that side and middle portions 30 and 29 of flange 28 would be shaped accordingly to engage sides 57 and bottom 58 of housing wall 55. Securement of the bracket and prevention from rotation can thus be achieved by frictional retention within the orifice, or by fastening of the flanges to the housing wall in any art recognized manner, such as by screwing, snap-fitting, adhesives or the like. Moreover, the bracket flanges need not have slots if an alternate method of securement is adopted.

Referring once again to FIG. 2, arm 35 preferably projects from distal end 22 of receiving portion 23 and flange face 42 of flange 28 in the longitudinal direction L. Arm 35 is preferably integral with receiving portion 23 and flange 28. It is contemplated, however, that arm 35 may project from receiving portion 23 or flange 28 so long as sufficient area is provided to support arm 35, and that arm 35 may be fastened or mounted to receiving portion 23 or flange 28 or a combination of receiving portion 23 and flange 28 in any manner known to those skilled in the art.

Figure 8:
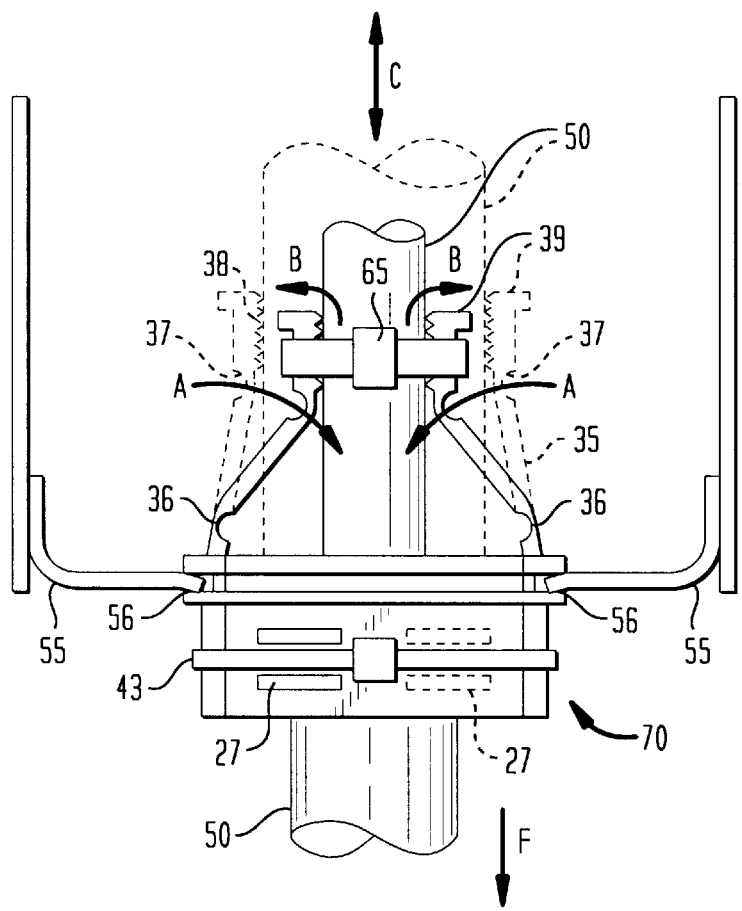
FIG. 8 is a top plan view depicting the bracket assembled to secure a cable of different diameters passing through a housing orifice in accordance with the present invention.

Arm 35 includes an angled portion 46 and a retaining portion 38 at the free end of arm 35. As is shown in FIG. 8, angled portion 46 preferably extends distally from flange face 42 toward a central axis C of cable 50. Arm 35 preferably includes a proximal hinge 36 located at the attached end of arm 35 and a distal hinge 37 located at the intersection of angled portion 46 and retaining portion 38. Proximal hinge 36 and distal hinge 37 are preferably living hinges, which are formed by notching arm 35 in a substantially semicircular fashion or other art-recognized manner of forming living hinges. Proximal hinge 36 and distal hinge 37 are constructed such that they permit angled portion 46 and retaining portion 38 to pivot about a plane at the midsection of proximal hinge 36 and distal hinge 37, respectively, without compromising the integrity of arm 35. Of course, hinges 36 and 37 may be substituted with other hinge types known to those skilled in the art.

Retaining portion 38 is preferably provided with teeth 40 for gripping the surface of cable 50 to provide strain relief. In addition, retaining portion 38 preferably includes a lip 39 at the distal end of retaining portion 38 to hold a fastener 65 (FIG. 7) in place about retaining portion 38. In an alternative embodiment, fastener 65 may be formed integrally with one or both retaining portions 38 or complementary portions of fastener 65 may be integrally formed on opposing retaining portions 38 so as to eliminate the need for a separate part, thereby speeding the assembly process. Teeth 40 may be substituted by a variety of other high friction surfaces known in the art, such as by knurling the retaining portion 38, or applying or forming a high friction material in that portion.

To reduce fabrication cost and simplify assembly, the first and second bracket portions preferably are identical in construction, and may be fabricated by injection molding. The bracket portions are preferably made of a strong, resilient, fire resistant material, such as polycarbonate, TEFLON® or polypropylene.

In an exemplary embodiment, the length of retaining portion 38 may be approximately 1.5 inches, while arm 35 may be 2.0 inches, yielding a total bracket portion 20 length of 3.5 inches. The radius R of retaining portion 38 may be 1.0 inch, and the width W of side portion 30 may be 0.25 inches. As such, the total width of bracket portion 20 is 2.5 inches. The height H of middle portion 29 may be approximately 0.50 inches, and the thickness T of wall 24 may be 0.13 inches, thereby yielding a retaining portion 28 thickness of 0.63 inches. As will be readily recognized by the person of skill in the art utilizing the teachings herein, the various dimensions described herein are exemplary, and may be readily modified and adapted to suit a wide variety of sizes and shapes. Thus a wide variety of shapes are contemplated and readily realized, making bracket portion 20 particularly suited to mass production as well as customization. Nonetheless, the specific dimensions by which any particular application is satisfied are a matter of application-specific design choice.

Further, while this invention is generally described in relation to cables secured to housings, it is readily apparent to those skilled in the art that this invention may be applied to any structure through which a cable, wire, rope, hose or other elongate object must pass and/or be secured.

Figure 7:
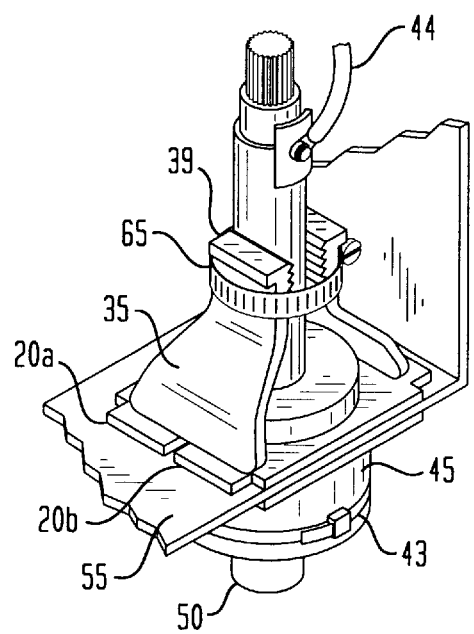
FIG. 7 is a perspective view of a bracket assembled to secure a cable passing through a housing orifice in accordance with the present invention.

Referring to FIGS. 6–9, a method of securing cable 50 passing through orifice 60 using bracket portions 20a and 20b is depicted. Prior to employing bracket portion 20, the junction box must be opened to expose orifice 60. As is shown in FIGS. 6 and 7, a first bracket portion 20a is positioned within orifice 60 such that receiving portion 23 may accept cable 50 and arm 35 extends into the housing interior. As is discussed above, in this position, slots 32 of side portions 30 engage sides 57 of housing wall 55, and slot 33 of middle portion 29 engages bottom 58 of housing wall 55. Cable 50 is then placed upon receiving portion 23.

Next, second bracket portion 20b is positioned within orifice 60 to mate with first bracket portion 20a, thereby forming a bracket 70 that encircles cable 50. Second bracket portion 20b is positioned similarly to first bracket portion 20a, except that second bracket portion 20b is rotated 180 degrees about the longitudinal direction L. As such, when second bracket portion 20b is positioned so that slots 32 of side portions 30 engage sides 57 of housing wall 55, and slot 33 of middle portion 29 engages bottom 58 of housing wall 55, arm 35b of second bracket portion 20b faces arm 35a of first bracket portion 20a within the housing interior. Thus, bracket portions 20a and 20b, when engaged, are symmetrical about axis C.

Figure 9:
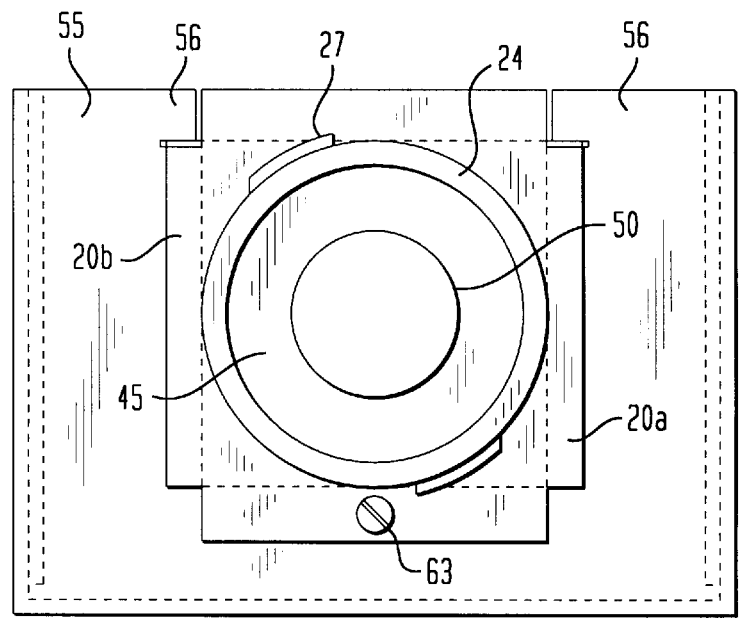
FIG. 9 is a front elevational view of the bracket assembled to secure a cable passing through a housing orifice in accordance with the present invention.

In the engaged position, opposing side portion confronting faces 71 and receiving portion confronting faces 72 of first bracket portion 20a and second bracket portion 20b mate with one another. Further, in the engaged position, shoulder 41 of first bracket portion 20a is positioned behind arm 35b of second bracket portion 20b to provide structural support to arm 35b when cable 50 is secured between first and second bracket portions 20a and 20b. Similarly, in the engaged position, shoulder 41 of second bracket portions 20b is positioned behind arm 35a of first bracket portion 20a to provide structural support to arm 35a. As shown in FIGS. 8 and 9, when bracket portions 20a and 20b are positioned about cable 50, slots 32 and 33 prevent bracket portions 20a and 20b from moving in a direction indicated by arrow F when cable 50 is loaded.

Next, arms 35a and 35b of first and second bracket portions 20a and 20b, respectively, are moved from a first position depicted in FIGS. 2–5 to a range of second positions, examples of which are shown in FIGS. 7 and 8. In the second position, cable 50 is secured between arm 35a and arm 35b. As is shown in FIG. 8, when arms 35a and 35b move from a first position (shown in dotted lines, for example) to a second position in a direction indicated by arrow A in FIG. 8, proximal hinge 36 permits angled portion 46 of arm 35 to resiliently swing inward, while distal hinge 37 permits retaining portion 38 to pivot in a direction indicated by arrow B so that retaining portion 38 is aligned with cable 50. At this time, arms 35a and 35b are preferably secured by cable tie 43, so that teeth 40 of retaining portion 38 grip cable 50. As shown in FIG. 8, a wider cable 50, shown in shadow lines, may also be accommodated, thus providing great application flexibility, as one bracket can be used to secure a wide variety of cable diameters. In this manner, arms 35a and 35b function to strain-relieve cable 50 such that wires that are broken out from cable 50 and terminated within the BEP housing are not pulled from their termination points when cable 50 is subjected to a force.

Prior to securing arms 35a and 35b of first bracket portion 20a and second bracket portion 20b, a fire-retardant material 45 may be applied to seal any gap between receiving regions 23 of first and second bracket portions 20a and 20b and cable 50. Fire-retardant material 45 may be a foam or a wrap, such as a preformed cable wrap, or any material that seals the gap between bracket 70 and cable 50 to help contain a fire to the BEP housing, such as, for example, flexible polimyde nonflammable compressed foam, or other such material that meets Underwriters Laboratories (U.L.) and local fire code standards.

In an exemplary embodiment, when first bracket portion 20a and second bracket portion 20b are matingly engaged at the first position, the distance between arms 35a and 35b ranges from approximately 2.0 inches at flange face 42 to approximately 1.0 inch at retaining portions 38. Upon being moved to a second position, the gap between arms 35a and 35b will typically decrease. However, arms 35a and 35b may also be moved in a direction opposite that indicated by arrow A in FIG. 8, and function to strain-relieve a wider cable 50.

Additionally, arms 35a and 35b may include a third hinge (not shown), intermediate proximal hinge 36 and distal hinge 37, to permit angled portion 46 of arms 35a and 35b to hinge outwardly. Further, as is discussed above, those skilled in the art will readily recognize that the various dimensions described herein are exemplary, and may be readily modified and adapted to suit a wide variety of sizes and shapes. The specific dimensions by which any particular application is satisfied are a matter of application-specific design choice.

Thus, the method of securing cable 50 is greatly simplified. The installer of cable 50 can lay cable 50 over first bracket 20a rather than pull or feed the cable through housing orifice 60. Further, because cable 50 is not pulled through orifice 60, the likelihood of damaging the cable is minimized.

Moreover, the bracket portions may be secured together in ways other than by surrounding the mated pieces with a cable tie, strap or the like. For example, the bracket portions may be provided with mating projections to achieve snap fitting, or the flanges could contain screw holes for screwing the portions together, or retaining clips could be formed or mounted on the bracket portions. Adhesives could also be applied. Two means of securing the brackets to the cable box are provided in FIGS. 8 and 9. As discussed above, first bracket 20a may be secured to housing wall 55 by means of screw 63, which may be inserted into throughhole 31 and screw hole 59 of housing wall 55, and appropriately fastened with a washer and nut (not shown) on the reverse side of wall 55. Further, middle portion 29 and side portions 30 can be constructed such that a notch 34 is formed at the point most distal from receiving portion 23. Notch 34 is dimensioned to accept a tab 56 of housing wall 55, which may be bent over side portion 30 to retain bracket portions 20a and 20b. In this fashion, bracket portions 20a and 20b may be prevented from being displaced relative to housing wall 55.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A cable bracket for securing a cable within an orifice in a surface, comprising:

a first and a second matingly engageable bracket portion, each portion having a cable-receiving region having a proximal end and a distal end, and an arm extending away from said distal end of said region, said arm having a retaining portion positioned outside said region, said arm being movable between a first position and a second position, said second position permitting securement of the cable between each respective retaining portions of each bracket portion when each bracket portion is matingly engaged with the other.

2. The cable bracket of claim 1, wherein each portion includes a flange extending radially outwardly from said distal end of said cable-receiving region for engaging said surface.

3. The cable bracket of claim 2, wherein said flange has a distal face from which said arm extends.

4. The cable bracket of claim 3, wherein said flange includes a support shoulder extending distally from said distal face to oppose said arm, said shoulder of said first bracket portion positioned behind said arm of said second bracket portion and said shoulder of said second bracket portion positioned behind said arm of said first bracket portion when said first and second bracket portions are matingly engaged.

5. The cable bracket of claim 2, wherein said flange includes a notch to facilitate securement of said bracket portions to said surface when said bracket portions are matingly engaged.

6. The cable bracket of claim 1, wherein said arm includes at least one hinge for permitting said retaining portion to move from said first position to said second position.

7. The cable bracket of claim 6, wherein said hinge is located proximal to said distal end of said cable-receiving region.

8. The cable bracket of claim 1, wherein said arm includes an angled portion proximal to said retaining portion and a first hinge pivotably connecting said angled portion and said retaining portion to permit said retaining portion to move from said first position to said second position.

9. The cable bracket of claim 8, wherein said angled portion includes a second hinge located proximal to said distal end of said cable-receiving region for facilitating movement of said arm from a first position to a second position when said bracket portions are matingly engaged.

10. The cable bracket of claim 1, wherein said retaining portion includes teeth for gripping said cable.

11. The cable bracket of claim 1, wherein, when said retaining portion is in said second position, said first and second bracket portions both secure and strain relieve said cable.

12. The cable bracket of claim 1, wherein each of said regions are symmetrical about an axis when matingly engaged and include an outer surface that retainingly engages said surface in such a manner as to prevent rotation about said axis.

13. The cable bracket of claim 1, further comprising a fastener for securing said bracket portions together when said bracket portions are matingly engaged.

14. The cable bracket of claim 1, wherein said fastener is integrally formed with said retaining portion.

15. The cable bracket of claim 1, further comprising a fastener for securing the retaining portions around said cable when said bracket portions are matingly engaged.

16. A cable bracket for securing a cable within an orifice in a surface, comprising:

at least two matingly engageable bracket portion, each portion having a cable-receiving region having a proximal end and a distal end, and an arm extending away from said distal end of said region, said arm having a retaining portion positioned outside said region, said arm being movable between a first position and a second position, said second position permitting securement of the cable between each respective retaining portions of each bracket portion when each bracket portion is matingly engaged with the other.

17. A method of securing a cable passing through an orifice in a surface, comprising the steps of:

(a) positioning within the orifice a first bracket portion, having a first region for receiving the cable and a first arm extending from said first region;

(b) laying the cable in said first region;

(c) positioning a second bracket portion, having a second region for receiving the cable and a second arm extending from said second region, over the cable and within the orifice to matingly engage said first bracket portion; and (d) moving said first arm and said second arm to a position that permits securement of the cable between said first arm and said second arm.

18. The method of claim 17, further comprising the step of enveloping the cable in a fire-retardant material.

19. The method of claim 17, wherein step (d) further comprises securing said arms about the cable.

20. The method of claim 17, further comprising the step of securing said first bracket portion to said second bracket portion at said first and second regions.

21. The method of claim 17, further comprising the step of fixing the position of said first bracket portion and said second bracket portion by securing at least one of said first and second bracket portions to said surface.

* * * * *